Nov. 20, 1928.
L. REITER ET AL
1,692,701
SNAP FASTENER
Filed Nov. 5, 1927
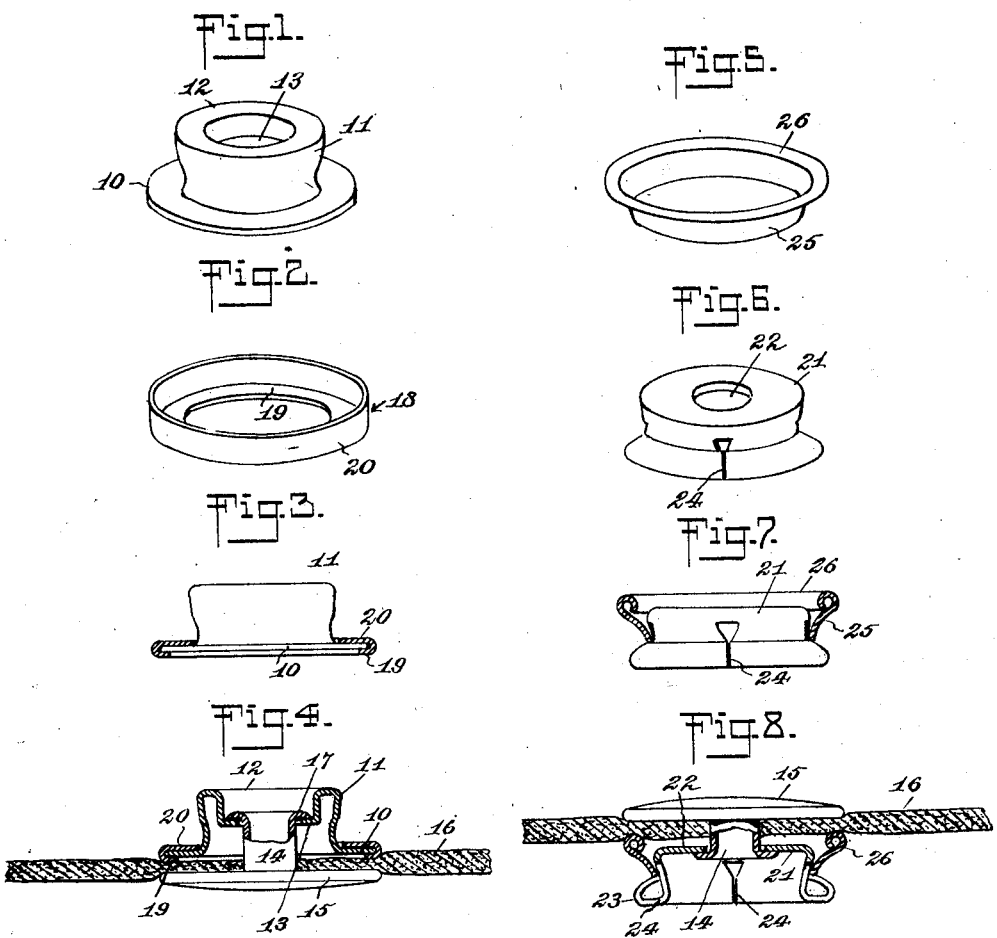
WITNESSES
INVENTOR
LUES REITER
ALLAN B. COLBY
BY
ATTORNEY Patented Nov. 20, 1928.

1,692,701

UNITED STATES PATENT OFFICE.

LUES REITER AND ALLAN B. COLBY, OF PROVIDENCE, RHODE ISLAND, ASSIGNORS TO RAU FASTENER CO., OF PROVIDENCE, RHODE ISLAND, A CORPORATION OF RHODE ISLAND.

SNAP FASTENER.

Application filed November 5, 1927. Serial No. 231,238.

The snap fastener of the present invention may have a wide range of utility, but is primarily designed for association with a fabric including a male member and a female member adapted to be riveted on to a piece of cloth or other flexible material.

In fasteners of this character as heretofore constructed, the fastener element proper lies on one side of the fabric, and an enlarged rivet head lies on the opposite side thereof, the fabric being clamped between a flange on the fastener proper and the head of the rivet.

Due to the relatively sharp edges of the fastener flange, undue strains on the fastener frequently result either in tearing the same bodily out of the fabric, or in cutting or fraying the fabric at the fastener edges.

In accordance with the present invention, we have designed a fastener which overcomes the above noted difficulties in that the fabric is firmly clamped between two round non-cutting edges, one formed on the rivet head and one on the fastener flange. By virtue of this arrangement, the fabric is firmly clamped, but danger of tearing the fabric, particularly if the latter is loosely woven, and danger of bodily pulling the fastener out of the fabric is entirely obviated.

Another object of the present invention is to provide a fastener in which undue expansion and consequent permanent distortion of the female fastener element is prevented. Preferably, the same means which is used to prevent tearing of the fabric, also serves to positively limit the expansion of the female member or socket, thereby prolonging the life of the fastener as well as rendering liability of tearing the fabric a negligible factor.

Other and further objects of the invention are to provide a snap fastener of simple, practical construction, which will be rugged, durable and efficient in use, and well suited to the requirements of economical manufacture and convenient application.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a perspective view of the male element of the fastener proper.

Fig. 2 is a perspective view of the ring which embraces the flange of the male element to cover up the sharp cutting edge thereof, the ring in Fig. 2 being shown before it is bent into its final form.

Fig. 3 is a sectional view showing the ring applied to the male element.

Fig. 4 is a sectional view showing the male element with its protective ring secured to a fabric anchorage by the use of a rivet, the fabric being clamped between the rounded non-cutting edges of the ring and rivet head.

Fig. 5 is a perspectipe view of the ring which is used on the female element.

Fig. 6 is a view of the female element before the ring is applied.

Fig. 7 is a view in section showing the ring applied to the female element.

Fig. 8 is a view similar to Fig. 4 showing the female element secured to a supporting fabric by the use of the rivet.

The male element of the fastener illustrated in Fig. 1 and the snap fastener element illustrated in Fig. 4 are of conventional construction. The male fastener element proper is preferably of integral formation including a disc or flange 10 from which the stud 11 is pressed upwardly. This stud is of an exterior shape to conveniently snap into a suitably prepared socket member, and the head of the stud is formed with a depression at 12, the base of this depression being apertured at 13 (Fig. 4) for the reception of the hollow shank 14 of a rivet, which rivet is provided with a relatively wide head 15 having rounded edges to prevent cutting of the fabric 16 clamped between the fastener element and rivet. The conventional manner of applying the rivet is to punch it through the fabric and spin the mouth of the shank over on to the bottom wall of the depression 12 as indicated at 17 in Fig. 4.

As thus far described, the construction may be entirely conventional, the present invention being concerned with the provision of an annular or ring-like member desigated generally at 18 and illustrated separately in Fig. 2. This member includes an annulus 19 of slightly larger external diameter than the flange 10, and an upstanding flange portion 20 integral with the free edge of the annulus.

To apply this ring to the fastener element of Fig. 1, the fastener element is dropped into place resting on the annulus 19 and the flange 20 is rolled or spun over the flange 10 as seen in Fig. 3, thereby providing a protective rolled edge which covers and conceals the relatively sharp edge of the flange 10.

By virtue of this arrangement, when the fastener is applied to the fabric 16 by the method above described, the fabric is clamped between the rounded edge of the rivet head 15 and the rolled edge provided by the ring 18, and there is no danger either of tearing the fabric or of cutting or fraying it adjacent the fastener. In loose woven fabrics this construction is particularly important, in that it prevents cutting, fraying, or bodily tearing out of the fastener when an undue strain is imposed thereon.

In Figs. 5 to 8 inclusive, we have illustrated a similar arrangement used in connection with the female or socket member which coacts with the stud 11. The conventional socket member is shown in Fig. 6 including a substantially cup-shaped element 21 having an opening 22 in its bottom for the reception of the rivet shank and having its side walls converging toward the mouth of the cup, and adapted to be spread apart by the entering stud. The rim of the cup is outwardly beaded as at 23 to strengthen the construction, and the desired spring action is had by the provision of slits 24 intersecting the bead and the side walls of the cup or socket.

The usual method of attaching this female element to the fabric 16 is by passing the shank of the stud through the opening 22 and spinning it over as in Fig. 8.

In accordance with the present invention however, we have provided a supplemental ring member illustrated in Fig. 5, which ring member is in the nature of a tapering annulus 25 having at its wider end an inturned rolled bead 26. The minimum diameter of the annulus 25 is approximately the same as the maximum diameter of the bottom of the socket 21 and the ring is applied by forcing it home over the bottom of the socket until the smaller edge of the ring strikes the bead 23 (see Fig. 8). In this position, the bead 26 provides a rounded annular surface coacting with the rolled edge of the rivet 15 to clamp the fabric 16 and prevent tearing thereof; while the smaller edge of the annulus 25 serves to positively limit the spreading of the socket as the stud member 11 is inserted into the socket.

By this arrangement, undue distortion of the socket member or female element is eliminated, and the beaded ring 25 serves the dual function of preventing tearing of the fabric and prolonging the life of the socket.

Obviously, various changes and alterations might be made in the general form and arrangement of the parts described without departing from the invention. Hence we do not wish to limit ourselves to the details set forth, but shall consider ourselves at liberty to make such changes and alterations as fairly fall within the spirit and scope of the appended claims.

We claim:

1. A female snap fastener element including a cup shaped body, beaded and split at its mouth to provide a spring socket having an opening in its bottom, a headed rivet, the hollow shank of which is passed through the opening and turned over against the bottom of the cup to secure the body to a fabric lying between the rivet head and body, a ring encircling the cup limiting expansion of the socket and having a rolled edge spaced from the body and coacting with the rivet head to clamp the fabric.

2. A female snap fastener element comprising a cup-shaped body having a beaded rim and split at its mouth to provide a spring socket having an opening in its bottom, a headed rivet having a hollow shank, the head having a rounded edge and the shank passed through the opening and upset against the bottom of the cup, and a ring having one of its edges rolled, said ring being mounted on the body in engagement with the head of the rim with its rolled edge projecting beyond the bottom of the socket of said body.

Signed at Providence, in the county of Providence and State of Rhode Island, this second day of November, A. D. 1927.

LUES REITER.
ALLAN B. COLBY.